Dec. 11, 1928.　　　　　　　　　　1,694,994
A. SUAREZ
COAL AUGER
Filed July 19, 1927　　　2 Sheets-Sheet 1
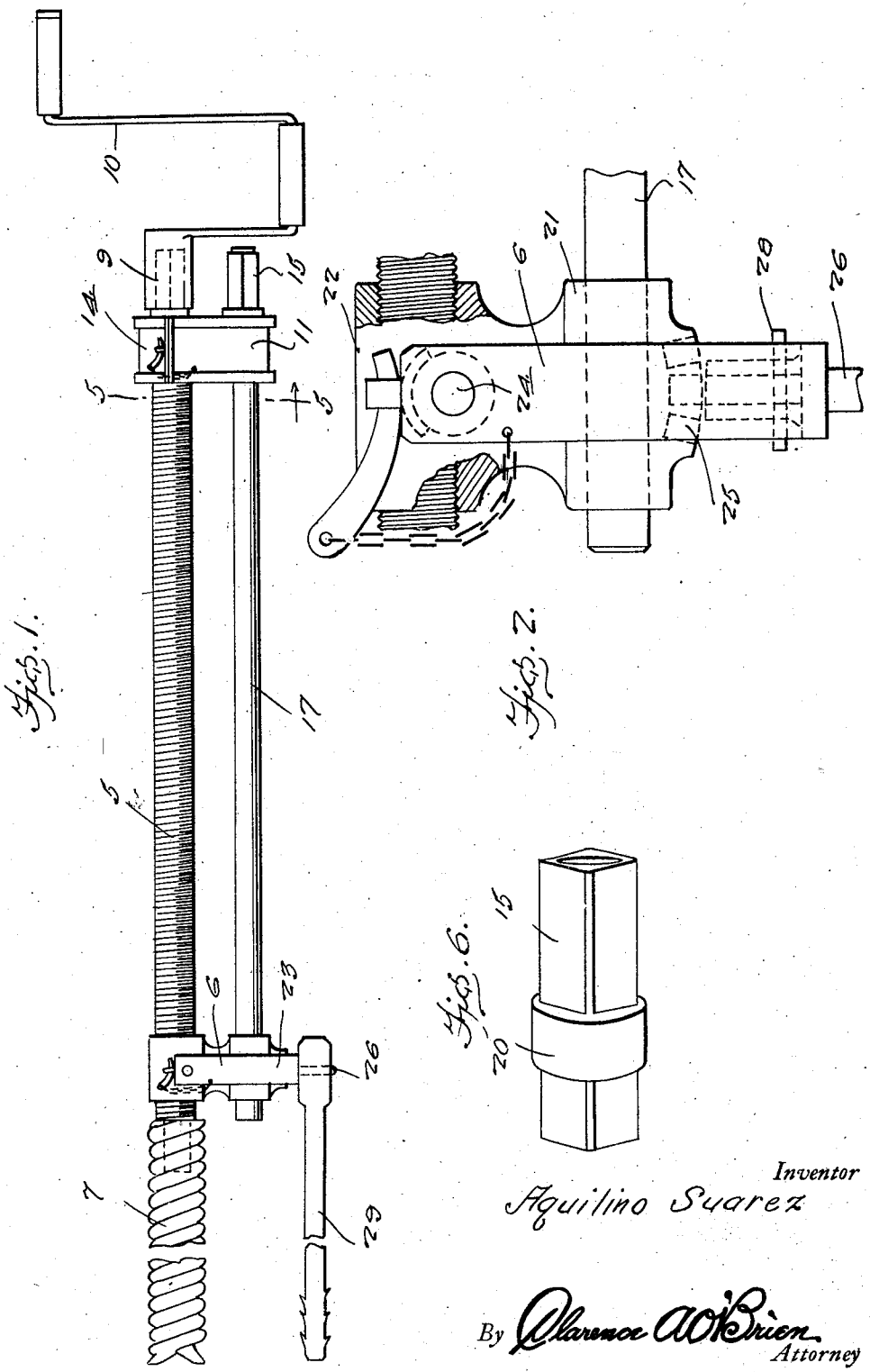
Inventor
Aquilino Suarez
By Clarence A. O'Brien
Attorney Dec. 11, 1928. 1,694,994
A. SUAREZ
COAL AUGER
Filed July 19, 1927 2 Sheets-Sheet 2
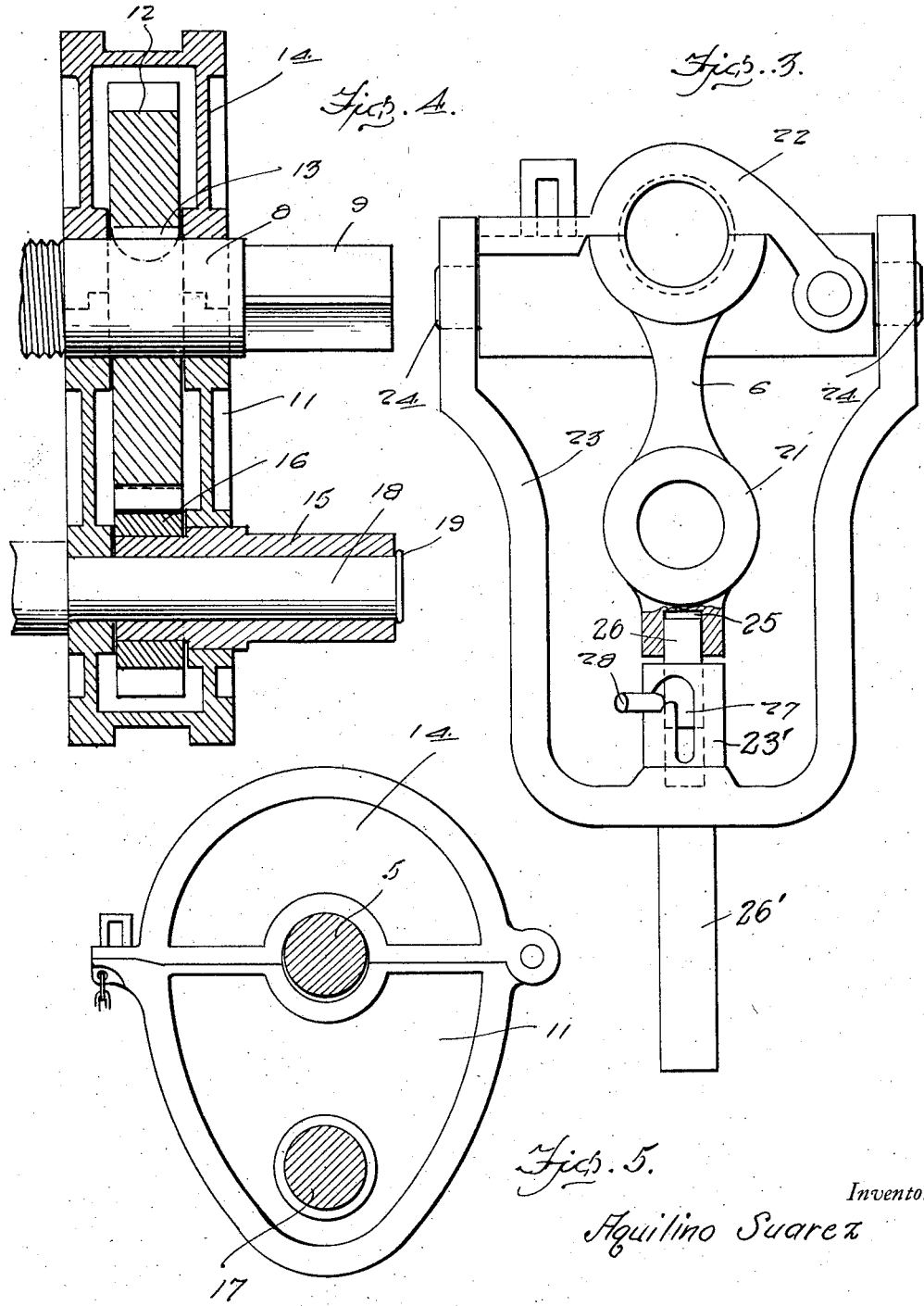
Inventor
Aquilino Suarez
By Clarence A. O'Brien
Attorney Patented Dec. 11, 1928.

1,694,994

UNITED STATES PATENT OFFICE.

AGUILINO SUAREZ, OF MOUNT CARMEL, PENNSYLVANIA.

COAL AUGER.

Application filed July 19, 1927. Serial No. 206,884.

My invention relates to coal drilling augers of a portable hand operated type and has for its principal object to provide a gear drive mechanism arranged to permit a reduction in the rotating speed in the auger whenever the same comes into contact with a hard strata of coal so that the added driving force necessary to enter the hardened substance will be provided through the means of the reduced gearing.

Another object of the invention is to provide a hand crank for operating the auger which may be easily and quickly interchangeably used for a direct drive with the auger for driving the same through the speed reduction gearing.

A still further object is to provide suitable means for anchoring and supporting the auger during the operation thereof.

Other objects and advantages reside in the special construction, combination and arrangement of the various elements forming the invention as more fully hereinafter described and claimed, reference being had to the accompanying drawings forming part hereof, wherein:

Figure 1 is a side elevational view of the device with the cranks shown in position for a direct drive of the auger, Figure 2 is an enlarged detail view showing the angular adjusting position for the forward supporting rod, Figure 3 is an end view, Figure 4 is a vertical sectional view through the gear housing, Figure 5 is a transverse sectional view taken substantially along a line 5—5 of Figure 1, and Figure 6 is a perspective view of the reducing gear shaft.

Referring now to the drawings I have disclosed my invention comprising an auger operating screw indicated at 5 having its forward end threadedly extending through a threaded opening formed in the upper end of a support indicated at 6 and movable longitudinally with respect to said support, the forward end of the screw being adapted to support an auger 7 or the like. The rear end of the screw is formed into a smooth shaft 8 terminating in a crank pin 9, square shaped in cross section and adapted to have a crank arm 10 attached thereto.

A gear housing 11 is arranged on the smooth end of the screw, said screw being rotatably arranged through the housing and mounted on the screw within the housing is a spur gear 12 suitably retained thereon as by means of a key 13. The upper end of the housing is provided with a hinged cover 14 providing means for mounting the housing and gear upon the smooth end of the screw 8.

The lower portion of the housing is provided with an opening extending longitudinally with respect to the screw 5 and within which is arranged one end of a tubular crank pin 15 having its ends formed square shaped in cross section, one end of said pin being arranged within the housing and having a small spur gear 16 mounted thereon and arranged in engagement with the large gear 12, with the opposite end of the pin 15 extending outwardly from the housing and adapted to receive the crank arm 10.

A rod 17 is arranged in parallel relation with respect to the screw 5 having one end thereof reduced in diameter as indicated at 18 and extending through the lower portion of the housing 11 and rotatably arranged within the bore of the crank pin 15. The outer end of the rod 18 is formed into a flange 19 whereby to retain the crank pin in position thereon. Intermediate the ends of the crank pin 15 is formed an annular collar 20 forming a bearing surface with the opening formed in the lower portion of the housing. It is obvious from the foregoing that the screw may be rotated through either direct engagement by the crank arm 10 with the crank pin 9 or through the reduction gear 16 by means of the crank pin 15.

The forward end of the rod 17 is slidably carried in a guide 21 integrally formed on the forward support 6, said support likewise having a hinged cover indicated at 22 permitting the removal of the screw 5 therefrom.

Upon the support 6 is provided a yoke 23 pivotally connected at its upper edge to pins 24 permitting swinging movement of the lower portion of the yoke longitudinally of the screw. At the underside of the guide 21 I provide a series of recesses 25 adapted to receive the upper end of a vertically disposed pin 26 slidably mounted in a socket member 23' arranged at the lower end of the yoke. A bayonet slot 27 is formed in the socket member within which a pin 28 extending from the pin 26 is arranged whereby to enable the selective arrangement of the pin 26 within one of the recesses 25.

An anchoring pin 29 is adapted to be driven horizontally in the side of the working compartment, the outer end of said pin having a vertically arranged bore for receiving a pin 26' extending downwardly from the yoke 23 as shown in Figure 1 so as to form a support for the forward end of the apparatus.

As shown in Figure 2 of the drawings it will be noted that the screw may be operated at an inclined angle by inserting the pin 26 in one of the angularly formed recesses 25. By providing the anchoring pin 29 upon which to support the forward end of the apparatus the operator is relieved of the weight thereof and may use both hands for operating the crank 10. For this reason a double grip is provided on said crank.

It is obvious that the invention is susceptible to various changes and modifications without departing from the spirit thereof or the scope of the appended claim and I accordingly claim all such forms of the device to which I am entitled.

I claim:

In a drilling apparatus, a screw having a drilling tool carried at one end thereof with a gear formed at its opposite end, a reduction gearing operatively connected therewith, a housing for said gearing, crank pins extending from each of said gears permitting selective operation of the screw through either thereof, a support arranged at the forward end of the screw and having a threaded opening for permitting longitudinal movement of the screw therethrough, a guide formed on the support, a rod arranged parallel with said screw having its rear end supported by said housing with its forward end slidably arranged in said guide, a yoke pivotally arranged on said support, a vertically arranged pin slidably mounted at the lower end thereof, said guide having recesses formed therein adapted to receive the upper end of said pin whereby to secure said yoke at angularly adjusted position with respect to said screw and an anchoring pin adapted to be driven horizontally in the side of the working providing supporting means for said yoke.

In testimony whereof I affix my signature.

AGUILINO SUAREZ.